(12) United States Patent
Heidemeyer et al.

(10) Patent No.: US 11,506,322 B2
(45) Date of Patent: Nov. 22, 2022

(54) ARRANGEMENT AND METHOD FOR DRAINING AT LEAST ONE LINE CONNECTED TO A LIQUID TANK

(71) Applicant: Kautex Textron GmbH & Co. KG, Bonn (DE)

(72) Inventors: Timm Heidemeyer, Cologne (DE); Hartmut Wolf, Königswinter (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 17/058,862

(22) PCT Filed: Apr. 25, 2019

(86) PCT No.: PCT/EP2019/060590
§ 371 (c)(1),
(2) Date: Nov. 25, 2020

(87) PCT Pub. No.: WO2019/228715
PCT Pub. Date: Dec. 5, 2019

(65) Prior Publication Data
US 2021/0222815 A1    Jul. 22, 2021

(30) Foreign Application Priority Data
May 29, 2018    (DE) .......................... 102018208469.6

(51) Int. Cl.
*F16L 55/07*    (2006.01)
*F15D 1/02*    (2006.01)
*F02M 25/022*    (2006.01)

(52) U.S. Cl.
CPC ................ *F16L 55/07* (2013.01); *F15D 1/02* (2013.01); *F02M 25/0222* (2013.01)

(58) Field of Classification Search
CPC ....... F16L 55/07; F15D 1/02; F02M 25/0222; F02M 25/025; F02M 25/0227;
(Continued)

(56) References Cited

U.S. PATENT DOCUMENTS

| 6,854,491 | B1 * | 2/2005 | Knight ..................... B67D 7/54 |
|---|---|---|---|
|  |  |  | 141/206 |
| 7,036,536 | B1 | 5/2006 | Knight et al. |

(Continued)

FOREIGN PATENT DOCUMENTS

| CN | 1930391 A | 3/2007 |
|---|---|---|
| CN | 107580657 A | 1/2018 |

(Continued)

OTHER PUBLICATIONS

Chinese Office Action, dated Nov. 3, 2021 (7 pages).

*Primary Examiner* — Kurt Philip Liethen
(74) *Attorney, Agent, or Firm* — Occhiuti & Rohlicek LLP

(57) ABSTRACT

The invention relates to an arrangement (100) having a liquid tank (10), at least one line (11, 11a, 11b) connected to the liquid tank (10), through which liquid (F) can be transported from the liquid tank (10), and a pump (13) connected to the at least one line (11, 11a, 11b) for conveying the liquid (F) from the liquid tank (10) through the at least one line (11, 11a, 11b) in the direction of flow (R) during an operating phase, wherein a pressure accumulator (14) connected to the at least one line (11, 11a, 11b) is provided, by means of which a pressure can be generated in the at least one line (11, 11a, 11b) outside of the operating phase, and a ventilating element (15, 15a, 15b), which can be transitioned into an open position and into a closed position, is arranged along the at least one line (11, 11a, 11b), wherein, outside of the operating phase, a pressure impulse within the at least one line (11, 11a, 11b) can be (Continued)

generated by the pressure generated by the pressure accumulator (14) and a subsequent transition of the ventilating element (15, 15a, 15b) into the open position in order to drain the line (11, 11a, 11b) of the fluid (F).

20 Claims, 3 Drawing Sheets

(58) Field of Classification Search
CPC . F02M 25/0221; Y02T 10/12; F01N 2610/02; F01N 2610/1493; F01N 3/2066; F01N 3/208
See application file for complete search history.

(56) References Cited

U.S. PATENT DOCUMENTS

| | | | | |
|---|---|---|---|---|
| 9,387,437 | B2* | 7/2016 | Hogan | F01N 3/20 |
| 10,677,231 | B2* | 6/2020 | Young | F04B 23/02 |
| 2009/0101656 | A1 | 4/2009 | Leonard | |
| 2013/0048081 | A1* | 2/2013 | Agrawal | F16L 55/02736 138/40 |
| 2013/0048129 | A1* | 2/2013 | Sadana | F16L 55/027 138/40 |
| 2014/0187666 | A1* | 7/2014 | Aizenberg | A61L 15/24 524/577 |
| 2017/0369769 | A1* | 12/2017 | Burks | C09K 8/68 |
| 2019/0017647 | A1* | 1/2019 | Dodge | F16L 9/22 |
| 2019/0040819 | A1* | 2/2019 | Heidemeyer | B01D 15/363 |

FOREIGN PATENT DOCUMENTS

| | | |
|---|---|---|
| DE | 102004054238 A1 | 5/2006 |
| DE | 102009014436 A1 | 10/2010 |
| DE | 102009014436 B4 | 10/2013 |
| DE | 102016216235 A1 | 3/2018 |
| EP | 2778381 A2 | 9/2014 |
| FR | 2879239 A1 | 6/2006 |
| NO | 2016/177561 A1 | 11/2016 |
| WO | 2017137101 A1 | 8/2017 |

* cited by examiner

ARRANGEMENT AND METHOD FOR DRAINING AT LEAST ONE LINE CONNECTED TO A LIQUID TANK

CROSS-REFERENCE TO RELATED APPLICATIONS

This application is a national phase under 35 U.S.C. 371 of International Application No. PCT/EP2019/060590 filed on Apr. 25, 2019, which claims priority to German Application No. 102018208469.6 filed on May 29, 2018, the contents of all of which are hereby incorporated by reference in their entireties.

The invention relates to an arrangement having a liquid tank, at least one line connected to the liquid tank, through which line liquid can be transported from the liquid tank, and a pump connected to the at least one line for conveying the liquid from the liquid tank through the at least one line in the direction of flow during an operating phase. The invention further relates to a method for draining at least one line connected to the liquid tank, through which line liquid is conveyed by means of a pump from the liquid tank in the direction of flow during an operating phase.

Such an arrangement can be provided, for example, in a motor vehicle. In the liquid tank, for example, water can be stored as the liquid which can be guided into the combustion chamber of the combustion engine via a line connected to the liquid tank, for example, in order to be able to achieve an emission reduction and/or improved performance of the combustion engine. Other areas of application are also conceivable.

If no liquid is conveyed through the line, for example when the combustion engine is deactivated, a residual amount of liquid usually remains in the line. In the case of a low ambient temperature, said residual liquid can freeze in the line, which can delay a restart when the combustion engine is activated. In addition, this can cause frost damage to the line because freezing of the liquid leads to a volume expansion of the liquid, resulting in an expansion of the line and possible damage to said line.

In order to prevent the liquid remaining in the line from freezing, it is currently known to heat the line electrically. However, this requires high energy expenditure and also high cost expenditure. Furthermore, additional installation space is required for the heating elements which have to be arranged over a great length of the line. In order to be able to achieve a constant heat output over the entire length of the line, the design of the entire heating device comprising the individual heating elements is also elaborate.

Therefore, the problem addressed by the invention is that of providing an arrangement and a method, by means of which the lines can be safely prevented from freezing with reduced energy expenditure and reduced cost expenditure.

According to the invention, the problem is solved by the features of the independent claims. Expedient embodiments and advantageous developments of the invention are disclosed in the dependent claims.

The arrangement according to the invention is characterized in that a pressure accumulator connected to the at least one line is provided, by means of which a pressure can be generated in the at least one line outside of the operating phase, and in that a ventilating element, which can be transitioned into an open position and into a closed position, is arranged along the at least one line, wherein, outside of the operating phase, a pressure impulse within the at least one line can be generated by the pressure generated by the pressure accumulator and a subsequent transition of the ventilating element into the open position in order to drain the line of the liquid.

The method according to the invention is further characterized in that, outside of the operating phase, by means of a pressure accumulator connected to the at least one line, a pressure is generated in the at least one line, and, by subsequently transitioning a ventilating element arranged along the at least one line into an open position, a pressure impulse is generated within the at least one line, by means of which the liquid contained in the at least one line can be removed from said line.

According to the invention, it is thus provided to remove the residue of liquid remaining in the line, so as to leave no residue, after an operating phase by generating a pressure impulse in the line, so that the line can be safely prevented from freezing at low temperatures. In addition, reactivation of the arrangement and thus starting of the operating phase can be made possible without a significant time delay even in the event of frost. As a result, heating elements for heating the line outside of the operating phase are no longer required, resulting in a significant reduction of energy and cost expenditures. The pressure impulse is generated by an interaction of a pressure accumulator with a ventilating element arranged along the line to be vented. By means of the pump, pressurized air can be generated and stored in the pressure accumulator, so that, when the pressure accumulator is opened outside of the operating phase, pressurized air can be guided through the line to be drained. Immediately after a pressure is generated in the line to be drained, the ventilating element provided on the line can be opened, so that the pressurized air guided through the line can balance itself out with regard to the atmosphere and thus escape from the line, wherein the residue of liquid located in the line can be carried along with the air and/or pushed out of the line with the air, so that the residue of liquid located in the line can be removed from the line. The pressure accumulator makes it possible to provide a sufficient pressure accumulator volume which can be evacuated when the line is drained, generating a particularly great pressure impulse which ensures that the line can be drained of liquid over its entire length. The pressure accumulator can be designed in the form of a pressure accumulator chamber. By means of the volume of the pressure accumulator, a gas spring can be produced. The ventilating element is preferably arranged on one end of the line to be drained, so that the ventilating element is arranged preferably at a maximum distance from the pressure accumulator. In the operating phase, in which liquid is guided from the liquid tank through the line to a consumer, the ventilating element is preferably closed. Once the operating phase is completed, i.e. outside of the operating phase, when no liquid is guided from the liquid tank through the line to a consumer, the ventilating element can be opened for a short period of time in order to drain the line of the residue of liquid. The ventilating element can be, for example, a ventilating valve. The line is preferably evacuated multiple times in succession by means of the pressure accumulator and the subsequent ventilation of the line via the ventilating element, so that a plurality of pressure impulses can be successively generated in the line in order to achieve a draining of liquid in the line without residue. The pressure accumulator is preferably connected to the line such that the pressure accumulator is integrated in the line and the liquid flows through the pressure accumulator when, in the operating phase, it is transported through the line from the liquid tank toward a consumer.

The pressure accumulator can have a volume $V_D$ and the at least one line can have a volume $V_L$, wherein it is preferably provided that $V_D \geq V_L$. The volume of the pressure accumulator is thus preferably at least as large as the volume of the line. By means of this volume ratio of the volume of the pressure accumulator to the volume of the line to be drained, it is possible, outside of the operating phase, to generate a sufficiently great pressure in the line by means of the pressure accumulator in order to be able to achieve particularly effective draining of the line.

During the operating phase, the liquid is conveyed from the liquid tank through the line by means of a pump. Said pump can preferably also be used for operating the pressure accumulator outside of the operating phase in order to generate a pressure in the pressure accumulator and thus also in the line. In this case, the pump is preferably a pump with a reversible conveying direction, so that the rotational direction of the pump is changeable. During the operating phase, the pump can be rotated forward, and outside of the operating phase, the pump can be rotated backwards in order to operate the pressure accumulator. The pump can be, for example, an orbital pump, a hose pump, a reciprocating pump, or a membrane pump. Preferably, the pump is arranged directly adjacent or close to the pressure accumulator. However, alternatively, it is also possible that a separate, additional pump is assigned to the pressure accumulator, which is only used to operate the pressure accumulator outside of the operating phase. The pump used to convey the liquid through the line during the operating phase can in this case be a standard pump, the conveying direction of which is not reversible.

The pressure accumulator, for example, can be designed such that a negative pressure can be generated by means of the pressure accumulator, by means of which negative pressure, outside of the operating phase, the liquid can be suctioned from the at least one line against the direction of flow in the direction of the pressure accumulator. The draining direction is thus oriented opposite to the direction of flow. In this case, the line to be drained is preferably connected to the pressure accumulator on an upper side of said pressure accumulator. Due to the generated negative pressure, the liquid can, outside of the operating phase, be suctioned from the line to be drained in the direction of the pressure accumulator. For this purpose, the pressure accumulator is preferably connected by its bottom portion to the pump, particularly to a suction side of the pump. The negative pressure can preferably be up to -200 mbar.

If the pressure accumulator is designed such that a negative pressure is generated and the residue of liquid can be suctioned from the line to be drained in the direction of the pressure accumulator, the pressure accumulator can have a collecting container for collecting the liquid drained from the at least one line. Due to the suction effect generated by the negative pressure, the liquid can be suctioned in the direction of the pressure accumulator when the line is drained. If the pressure accumulator has a collecting container, said suctioned liquid can be collected directly in the pressure accumulator, in particular in the collecting container of the pressure accumulator, so that no additional container for collecting the liquid removed from the line must be provided, which would require additional installation space. In the event of restarting the operating phase, the liquid collected in the collecting container can be conveyed by the operation of the pump back into the line and subsequently to the consumer connected to the line.

The pressure accumulator can further be designed such that, by means of the pressure accumulator, an excess pressure can be generated, by means of which the liquid can be removed, outside of the operating phase, in the direction of flow, from the at least one line. The draining direction is thus oriented in the same direction as the direction of flow. In such a configuration, the pressure accumulator can generate an excess pressure, with which the residue of liquid can be flushed from the line. When the line is drained, the liquid is then pushed away from the pressure accumulator. In this configuration, the line is preferably connected to the pressure accumulator in a region of a bottom portion of said pressure accumulator, so that liquid in the pressure accumulator can also be drained when the line is drained. The excess pressure can preferably be up to +400 mbar.

In this configuration, it can preferably be provided that a collecting container connected to the at least one line for collecting the liquid removed from the at least one line is arranged spaced apart from the pressure accumulator. In this case, the collecting container can be provided separately from the pressure accumulator. The collecting container can be connected to a consumer, for example a windshield washer system, so that the liquid collected in the collecting container can be reused.

In order to be able to achieve the removal of the residue of liquid particularly quickly and efficiently, the at least one line can preferably have an inner surface formed from a low-energy material. With the use of a low-energy material on the inner surface of the line, the line can have a low surface energy in the region of contact with the liquid, so that the residue of liquid in the line can lie on the inner surface in the form of drops because the liquid can contract due to the low surface energy. As a result, the formation of a liquid film on the inner surface of the line can be prevented. The drop form of the liquid allows for quicker and simpler removal of the residue of liquid by means of the generated pressure impulse. The low-energy material used preferably has a surface energy which is less than 30 mN/m, preferably less than 20 mN/m. The material of the inner surface of the line is preferably formed from a plastics material. Particularly preferably, the material can be PTFE (polytetrafluoroethylene) or ETFE (ethylene tetrafluoroethylene copolymer). In order to form a corresponding inner surface, the line can be formed entirely from a low-energy material, or, on its inner side, the line can have a coating made from a low-energy material, wherein the coating thus forms the inner surface of the line.

Furthermore, it is also possible that the inner surface of the pressure accumulator is formed from such a low-energy material in order to be able to also achieve efficient removal of the liquid in the pressure accumulator by means of the pressure impulse outside of the operating phase, particularly if the pressure accumulator is not used as a collecting container for the liquid suctioned from the line.

The arrangement can have one but also more than one line which can be drained by means of the pressure accumulator and a ventilating element interacting accordingly with the pressure accumulator. For example, a first line designed as a feed line and a second line designed as a return line can be provided, which each have a ventilating element, wherein the first line and the second line can be connected to the pressure accumulator so that, outside of the operating phase, a pressure impulse for draining liquid from the first line can be generated in the first line, and a pressure impulse for draining liquid from the second line can be generated in the second line. Therefore, the same pressure accumulator can be provided for draining more than one line. In this case, more than two lines can also be provided. The individual lines are preferably drained in a time-delayed manner and thus successively, so that, for example, one or more pressure impulses are initially generated in the first line, and subsequently, one or more pressure impulses are generated in the second line.

In order to be able to achieve good compactness and a simplified installation of the arrangement, the pump and the pressure accumulator can be arranged in a modular unit which in turn can be arranged on the liquid tank. Therefore, the pump, the pressure accumulator and also further elements, for example a temperature sensor and/or a pressure sensor, can be preinstalled in the modular unit, so that they can be arranged jointly as one unit on the liquid tank.

In the following, the invention shall be described in more detail with reference to the attached drawings using preferred embodiments.

Figure 1:
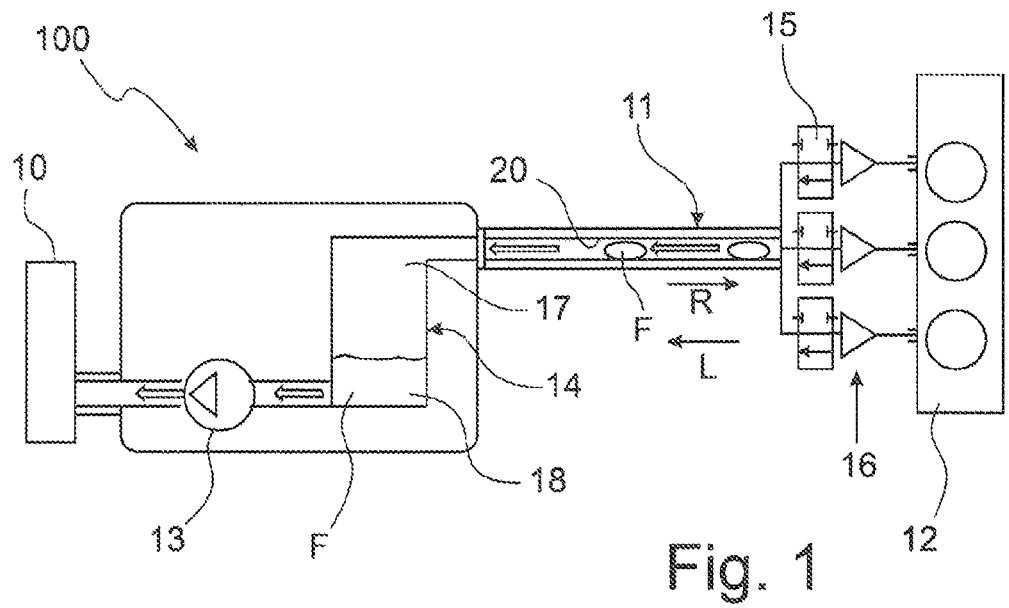
FIG. 1 shows a schematic representation of an arrangement according to one embodiment of the invention.
Figure 2:
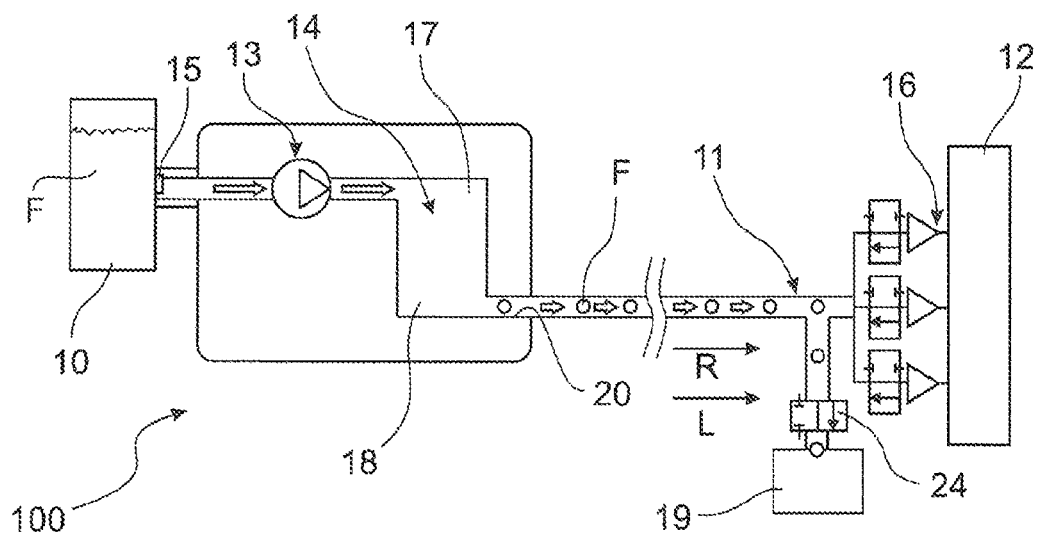
FIG. 2 shows a schematic representation of an arrangement according to a further embodiment of the invention.

FIGS. 1 and 2 each show an arrangement 100, having a liquid tank 10, from which liquid F is conducted or guided via a line 11 in the direction of flow R towards a consumer 12. The consumer 12 can be, for example, part of a motor vehicle, such as a combustion engine, into which liquid F in the form of water can be introduced, particularly injected, from the liquid tank 10 in order to reduce emissions and/or improve performance.

During an operating phase, the liquid F is conveyed in the direction of flow R by means of a pump 13, which is connected to the line 11, through the line 11 towards the consumer 12.

After completion of an operating phase, i.e. when liquid F is no longer conveyed to the consumer 12, it is intended that a residue of liquid F is prevented from remaining in the line 11 in order to prevent the liquid F from freezing at low temperatures.

In order to remove the residue of liquid F from the line 11, a pressure accumulator 14 is provided, by means of which a pressure above or below an atmospheric pressure can be generated in the line 11 outside of the operating phase. In the depicted arrangement 100, the pressure accumulator 14 is connected to the line 11 such that the liquid F is guided through the pressure accumulator 14 when transported towards the consumer 12 during the operating phase. In this case, the pressure accumulator 14 is designed in the form of a pressure accumulator chamber.

The pressure accumulator 14 is arranged directly adjacent to the pump 13. By means of the pump 13, the pressure for the pressure accumulator 14 can be generated in that air can be suctioned by means of the pump 13. In order to ensure that the pump 13 can convey the liquid F during the operating phase towards the consumer 12 and operate the pressure accumulator 14 outside of the operating phase, by generating pressure in the pressure accumulator 14 by suctioning air, the pump 13 is designed in the form of a pump 13 with a reversible conveying direction.

In addition to the pressure accumulator 14, a ventilating element 15, which can be transitioned into an open position and into a closed position, is arranged along the line 11 for draining the line 11 of liquid F outside of the operating phase. The ventilating element 15 is additionally designed such that it is possible to switch between a feed of air from the outside into the line 11 and a feed of liquid F from the liquid tank 10 into the line 11. The ventilating element 15 can be designed in the form of a ventilating valve. The ventilating valve is, for example, a 3/2-way valve. In the embodiment shown in FIG. 1, the ventilating element 15 is arranged on one end of the line 11, said end being connected to a dosing unit 16, via which the liquid F can be introduced from the liquid tank 10 into the line 11 in a dosed manner during the operating phase in order to be conveyed or guided to the consumer 12. In the embodiment shown in FIG. 2, the ventilating element 15 is arranged at the transition from the tank 10 to the line 11.

Due to the interaction of the pressure accumulator 14 with the ventilating element 15, it is possible outside of the operating phase to generate a pressure impulse in the line 11, by means of which the liquid F can be removed from the line 11 so as to leave as little residue as possible. A pressure is generated by means of the pump 13 and the pressure accumulator 14, so that pressurized air can be guided through the line 11 to be drained. Immediately after a pressure is generated in the line 11 to be drained, the ventilating element 15 provided on the line 11 is opened, so that the pressurized air guided through the line 11 can balance itself out with regard to the atmosphere and thus escape from the line 11, wherein the residue of liquid F located in the line 11 can be carried along with the air and can thus be removed from the line 11. The pressure accumulator 14 makes it possible to provide a sufficient pressure accumulator volume which can also be evacuated when the line 11 is drained, generating a particularly great pressure impulse which ensures that the line 11 can be drained of liquid F over its entire length. The line 11 is preferably evacuated multiple times in succession by means of the pressure accumulator 14 and the subsequent ventilation of the line 11 via the ventilating element 15, so that a plurality of pressure impulses can be successively generated in the line 11 in order to achieve draining of liquid in the line 11 without residue.

In the embodiment shown in FIG. 1, the pressure accumulator 14 is designed such that, by means of the pressure accumulator 14, a negative pressure, i.e. a pressure below atmospheric pressure, can be generated, by means of which the liquid F can be suctioned from the line 11 outside of the operating phase.

The pressure accumulator 14 is connected to the pump 13 on the suction side of said pump. In this case, the liquid F is suctioned against the direction of flow R, so that the draining direction L is opposed to the direction of flow F when the liquid is suctioned. The liquid F suctioned from the line 11 is collected in the pressure accumulator 14. For this purpose, the pressure accumulator 14 can have, or itself form, a collecting container, as can be seen in FIG. 1. In this case, the line 11 is connected to the pressure accumulator 14 on an upper side 17 of the pressure accumulator 14. The pump 13 is arranged on a height level with the bottom portion 18 of the pressure accumulator 14. As a result, liquid F collected in the pressure accumulator 14 can be prevented from being able to flow back into the line 11. In this case, a plurality of ventilating elements 15 is arranged adjacent to the dosing unit 16. The ventilating elements 15 form valves of the dosing unit 16. The ventilating elements 15 are opened periodically, and thus at each pressure impulse, so that air can flow in in an intermittent manner.

FIG. 2 shows an embodiment in which the pressure accumulator 14 is designed such that, by means of the pressure accumulator 14, an excess pressure, i.e. a pressure above atmospheric pressure, can be generated, by means of which the liquid F can be removed from the line 11 in the direction of flow R outside of the operating phase, as is indicated by means of the arrows between the liquid F draining in the form of drops. In this case, the draining direction L is thus the same as the direction of flow R. The suctioned air is stored in the pressure accumulator 14 under pressure. In this embodiment, the line 11 is connected to the pressure accumulator 14 at the bottom portion 18 of the pressure accumulator 14, so that the liquid F can drain entirely from the pressure accumulator 14 via the line 11 in the direction of flow R. In this case, the liquid is not suctioned from the line 11 but pushed out of the line 11 in the direction of flow R. The pump 13 is arranged on a height level with the upper side 17 of the pressure accumulator 14. On one end of the line 11, a separate collecting container 19 is arranged, into which the liquid F pushed out of the line 11 flows and is collected. The collecting container 19 is assigned to a valve 24 which is opened when the line 11 is drained. During the operating phase, the valve 24 is closed, so that no liquid F can flow from the line 11 into the collecting container. In the embodiment shown in FIG. 2, the valves of the dosing unit 16 are closed when the line 11 is drained of the liquid F in order to prevent the liquid F from flowing back into the dosing unit 16.

Figure 6:
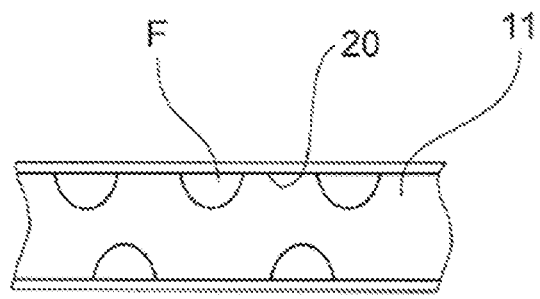
FIG. 6 shows a schematic representation of the drop formation in the line.

In order to prevent the liquid F from depositing in the form of a film on the inner surface 20 of the line 11, the inner surface 20 of the line 11 is formed from a low-energy material, for example PTFE or ETFE, which has a low surface energy, so that the residue of the liquid F, which has to be drained from the line 11 outside of the operating phase, is present in the form of drops, as can be seen in FIG. 6. The inner surface of the pressure accumulator 14 can also be formed from such a low-energy material.

Figure 3:
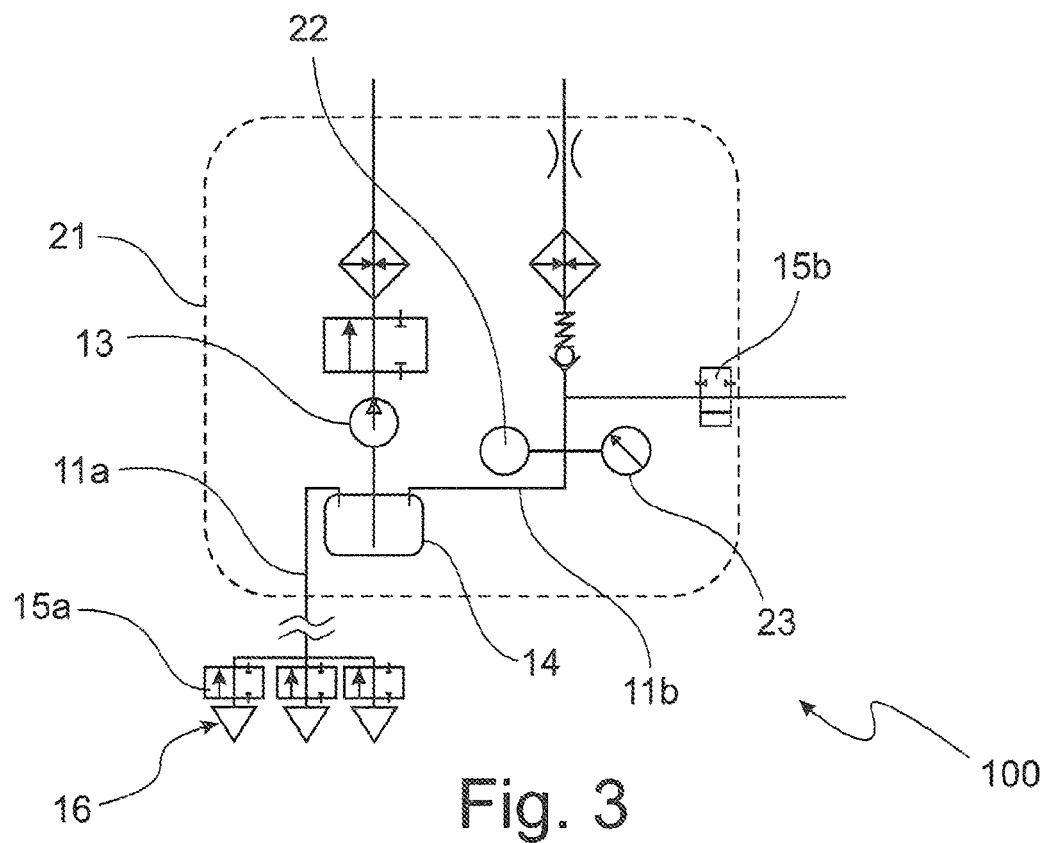
FIG. 3 shows a schematic representation of one embodiment, in which particularly the pressure accumulator and the pump are arranged in a modular unit.

FIG. 3 shows an embodiment of the arrangement 100, in which the pressure accumulator 14 and the pump 13 are arranged in a modular unit 21 of the arrangement 100. Further elements, for example a temperature sensor 22 or a pressure sensor 23, can be arranged in said modular unit 21.

Figure 4:
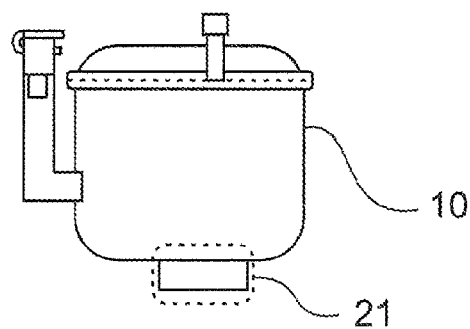
FIG. 4 shows a schematic representation of an arrangement according to the invention, in which the modular unit shown in FIG. 3 is arranged on the liquid tank.

The modular unit 21 can be arranged on the liquid tank 10 as a complete unit, as shown in FIG. 4.

In the embodiment shown in FIG. 3, the arrangement 100 has not only one line 11 but two lines 11a, 11b, in that a first line 11a designed as a feed line and a second line 11b designed as a return line are provided, which each have a ventilating element 15a, 15b, wherein the first line 11a and the second line 11b are connected to the pressure accumulator 14, so that, in the first line 11a, a pressure impulse can be generated for draining the first line 11a of liquid F and, in the second line 11b, a pressure impulse can be generated for draining the second line 11b of liquid F. In this case, the same pressure accumulator 14 is provided for draining more than one line 11a, 11b.

Figure 5:
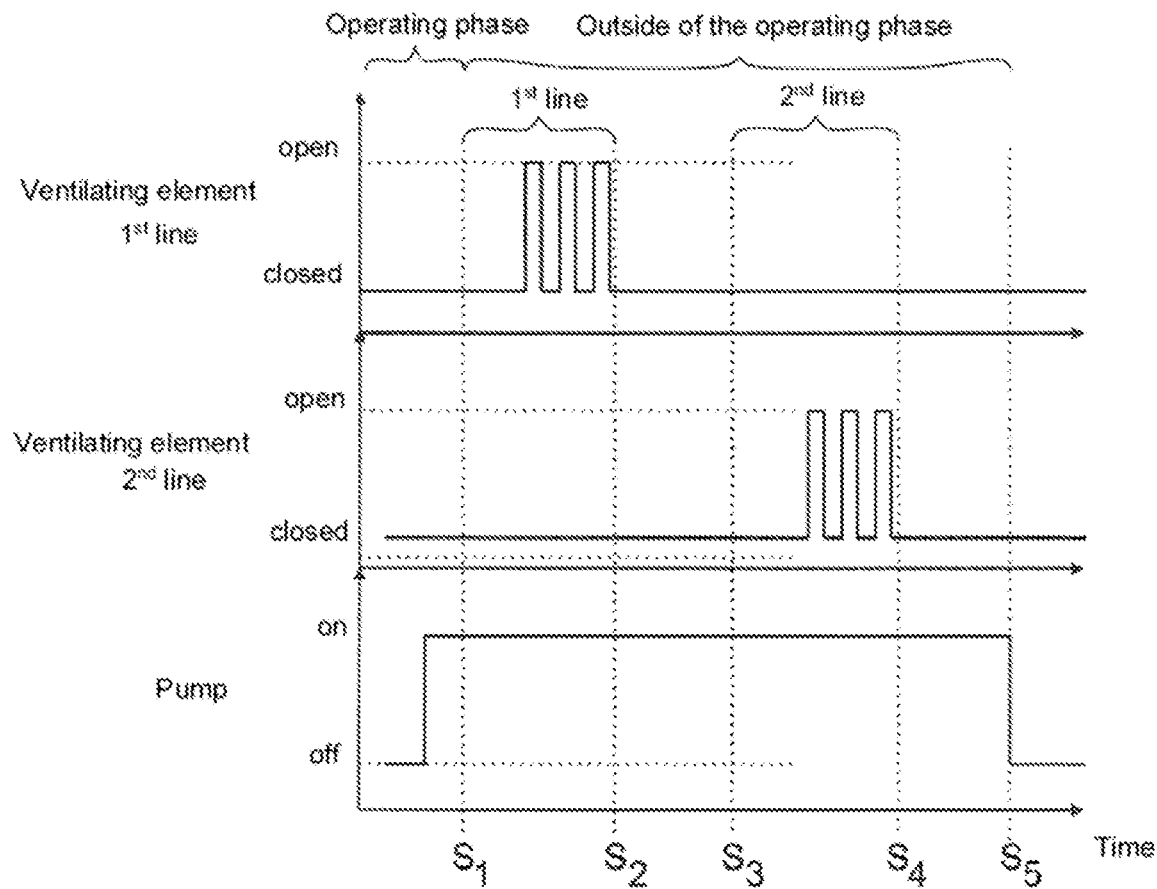
FIG. 5 shows a graphic representation of a sequence for draining the lines of liquid.

FIG. 5 shows a graphic representation of the sequence of a process for draining the lines 11a, 11b shown in FIG. 4 of a residue of liquid F after an operating phase and thus outside of the operating phase. The individual lines 11a, 11b are drained in a time-delayed manner and thus successively in the time interval $S_1$-$S_5$ which represents the state "outside of the operating phase."

Initially, the first line 11a is drained in the time period $S_1$-$S_2$. In order to drain the first line 11a, a plurality of pressure impulses is generated in quick succession in the first line 11a, wherein the pressure impulses each take place when the ventilating element 15a of the first line 11a is opened for a brief moment. After the first line 11a is drained, the second line 11b is drained in the time period $S_3$-$S_4$, wherein a plurality of pressure impulses is once again generated in quick succession in the second line 11b, wherein the pressure impulses each take place when the ventilating element 15b of the second line 11b is opened for a brief moment.

During the entire time interval $S_1$-$S_5$, the pump 13 is in operation in order to generate a pressure, particularly an excess pressure or a negative pressure, in the pressure accumulator 14 and provide said pressure for the lines 11a, 11b, so that said pressure can interact with the ventilating process of the lines 11a, 11b via the ventilating elements 15a, 15b in order to generate the pressure impulses.

LIST OF REFERENCE SIGNS

Arrangement 100
Liquid tank 10
Line 11, 11a, 11b
Consumer 12
Pump 13
Pressure accumulator 14
Ventilating element 15, 15a, 15b
Dosing unit 16
Upper side 17
Bottom portion 18
Collecting container 19
Inner surface 20
Modular unit 21
Temperature sensor 22
Pressure sensor 23
Valve 24
Liquid F
Direction of flow R
Draining direction L

The invention claimed is:

1. An arrangement comprising:
   a liquid tank,
   at least one line connected to the liquid tank, through which line liquid can be transported from the liquid tank, and
   a pump connected to the at least one line for conveying the liquid from the liquid tank through the at least one line in the direction of flow during an operating phase, the pump having a reversible conveying direction;
   a pressure accumulator, connected to the at least one line, configured to generate, by means of the pump, a pressure in the at least one line outside of the operating phase, and
   a ventilating element, which can be transitioned into an open position and into a closed position, configured to be arranged along the at least one line, wherein, outside of the operating phase, a pressure impulse within the at least one line can be generated by the pressure generated by the pressure accumulator and a subsequent transition of the ventilating element into the open position in order to drain the line of the liquid.

2. The arrangement according to claim 1, wherein:
   the pressure accumulator has a volume $V_D$ and the at least one line has a volume $V_L$, wherein $V_D \geq V_L$.

3. The arrangement according to claim 1, wherein:
   by means of the pressure accumulator, a negative pressure can be generated, by means of which, outside of the operating phase, the liquid can be suctioned from the at least one line against the direction of flow in the direction of the pressure accumulator.

4. The arrangement according to claim 3, wherein:
the pressure accumulator has a collecting container for collecting the liquid suctioned from the at least one line.

5. The arrangement according to claim 1, wherein:
by means of the pressure accumulator, an excess pressure can be generated, by means of which, outside of the operating phase, the liquid can be removed from the at least one line in the direction of flow.

6. The arrangement according to claim 5, wherein:
a collecting container connected to the at least one line for collecting the liquid removed from the at least one line is arranged spaced apart from the pressure accumulator.

7. The arrangement according to claim 1, wherein:
a first line designed as a feed line and a second line designed as a return line are provided, which each have a ventilating element, wherein the first line and the second line are connected to the pressure accumulator, so that, outside of the operating phase, a pressure impulse for draining liquid from the first line can be generated in the first line, and a pressure impulse for draining liquid from the second line can be generated in the second line.

8. The arrangement according to claim 1, wherein:
the pump and the pressure accumulator are arranged in a modular unit which is arranged on the liquid tank.

9. The arrangement according to claim 1, wherein:
the at least one line has an inner surface formed from a low-energy material.

10. The arrangement according to claim 9, wherein:
the low-energy material has a surface energy which is less than 30 mN/m.

11. The arrangement according to claim 9, wherein:
the low-energy material has a surface energy which is less than 20 mN/m.

12. The arrangement according to claim 1, wherein the pressure accumulator is a pressure accumulation chamber within the line.

13. The arrangement according to claim 12, wherein, during the operating phase, the liquid flows through the pressure accumulator.

14. The arrangement according to claim 1, wherein the pressure is generated outside of the operating phase and before the transition of the ventilating element.

15. The arrangement according to claim 14, wherein the pressure impulse is generated at the time of the transition of the ventilating element into the open position.

16. A method for draining at least one line connected to a liquid tank, through the at least one line a liquid is conveyed during an operating phase by means of a pump from the liquid tank in the direction of flow, wherein, by means of a pressure accumulator connected to the at least one line, a pressure is generated, by means of the pump, in the at least one line outside of the operating phase, and by transitioning a ventilating element arranged along the at least one line into an open position, a pressure impulse is subsequently generated within the at least one line, by means of which pressure impulse the liquid contained in the at least one line is removed from said line, wherein the pump has a reversible conveying direction.

17. The method of claim 16, wherein the pressure accumulator is a pressure accumulation chamber within the line.

18. The method of claim 17, wherein, during the operating phase, the liquid flows through the pressure accumulator.

19. The method of claim 16, wherein the pressure is generated outside of the operating phase and before the transition of the ventilating element.

20. The method of claim 19, wherein the pressure impulse is generated at the time of the transition of the ventilating element into the open position.

* * * * *